United States Patent
Lanzaro

[15] 3,638,883
[45] Feb. 1, 1972

[54] CROSS-RATE AXIS SENSOR
[72] Inventor: Andre Lanzaro, Albany, Calif.
[73] Assignee: Dynasciences Corporation, Blue Bell, Pa.
[22] Filed: May 21, 1968
[21] Appl. No.: 730,776

[52] U.S. Cl. ............................................................244/1
[51] Int. Cl. ..........................................................B64g 1/00
[58] Field of Search ...........................244/1, 3.15, 3.2, 3.22

[56] References Cited

UNITED STATES PATENTS

| | | | |
|---|---|---|---|
| 3,189,299 | 6/1965 | Garner et al. | 244/1 |
| 3,304,029 | 2/1967 | Ludtke | 244/3.20 |
| 3,339,864 | 9/1967 | Whitson | 244/1 |
| 3,365,147 | 1/1968 | Wolfe | 244/1 |
| 3,384,323 | 5/1968 | Gilbert et al. | 244/1 |

Primary Examiner—Milton Buchler
Assistant Examiner—Jeffrey L. Forman
Attorney—Donald E. Nist

[57] ABSTRACT

A cross-rate axis sensor is provided for use with a moving vehicle, such as an elongated space vehicle, which undergoes both spinning and coning motion. The sensor which may be rotatably mounted about the longitudinal axis of the vehicle continually aligns itself with the instantaneous direction of transverse angular velocity or cross-rate axis of the vehicle due to coning motion, and the angular position of the rotatable sensor relative to the vehicle can be used to phase the torques provided by a thrust-producing nozzle mounted on the vehicle to reduce and eventually eliminate the coning motion. The sensor includes a rotatively driven momentum wheel, the axis of rotation of which continuously follows the cross-rate axis, and a cylindrical member rotatably mounted about an axis parallel to the vehicle axis of the elongation within the vehicle and having a hollow interior within which the momentum wheel is rotatably mounted as a gyroscope element in a balanced single degree of freedom gimbal system.

11 Claims, 11 Drawing Figures

PATENTED FEB 1 1972
3,638,883
SHEET 1 OF 3
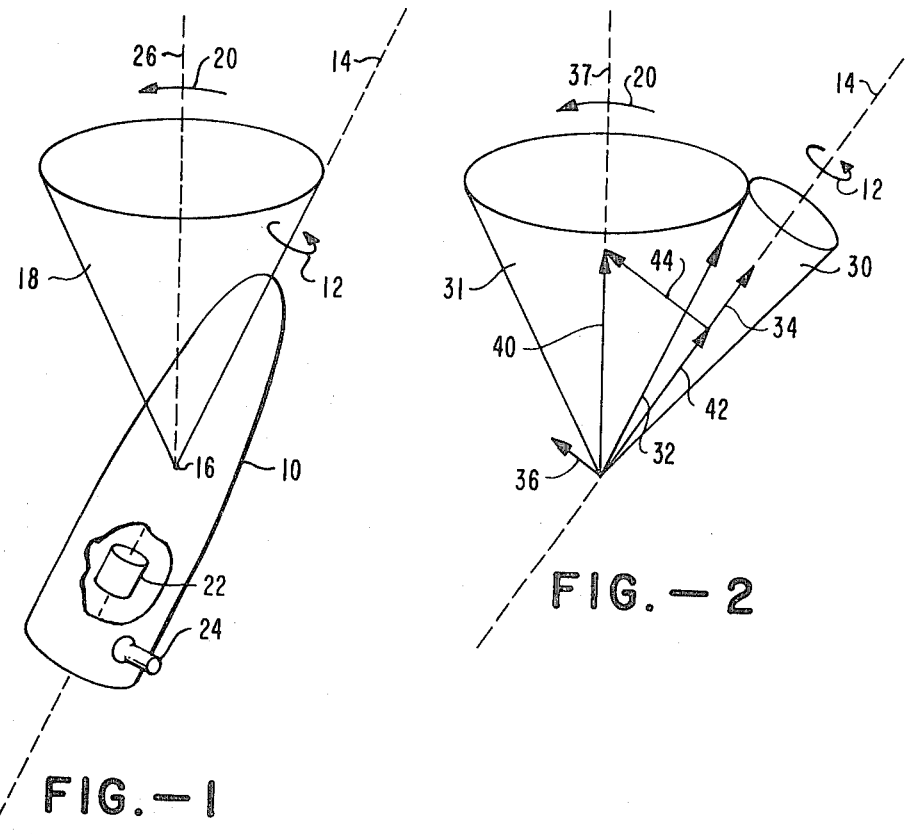
FIG.—1
FIG.—2
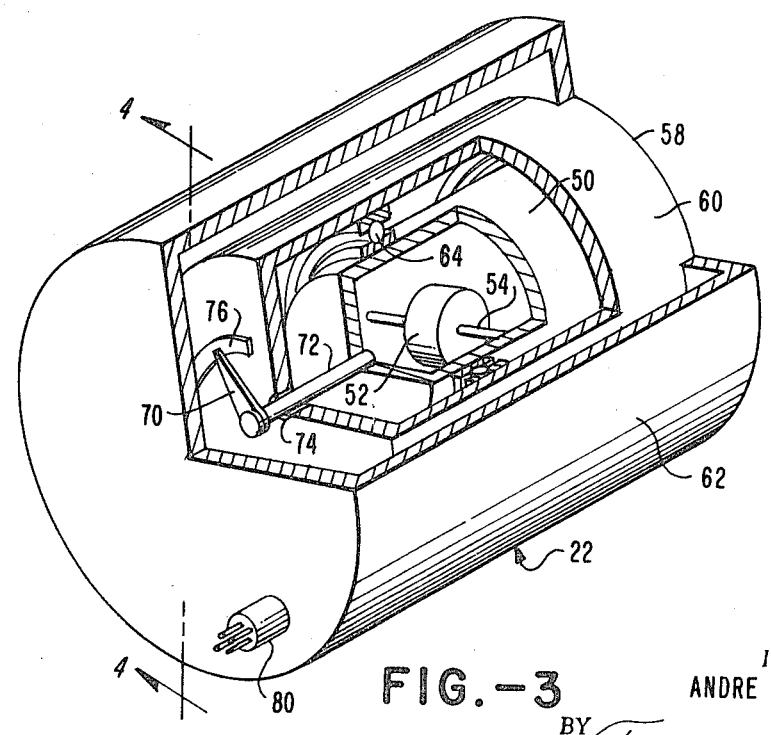
FIG.—3
INVENTOR.
ANDRE LANZARO
BY Fraser and Bogucki
ATTORNEYS PATENTED FEB 1 1972
3,638,883
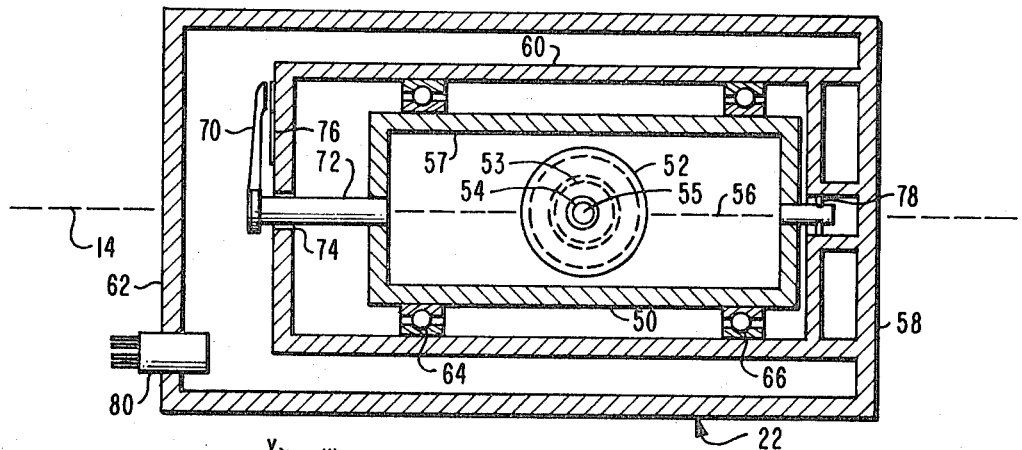
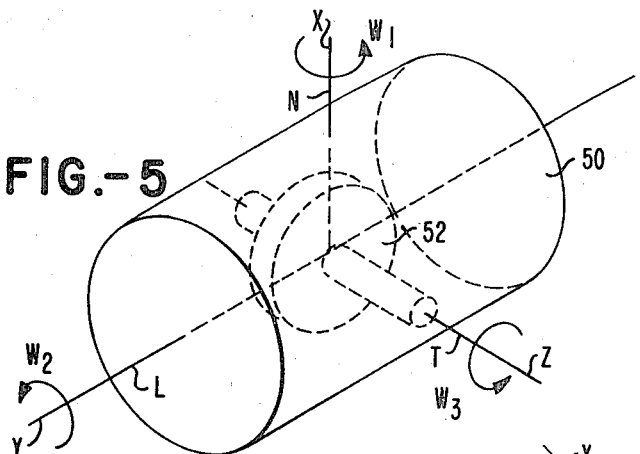
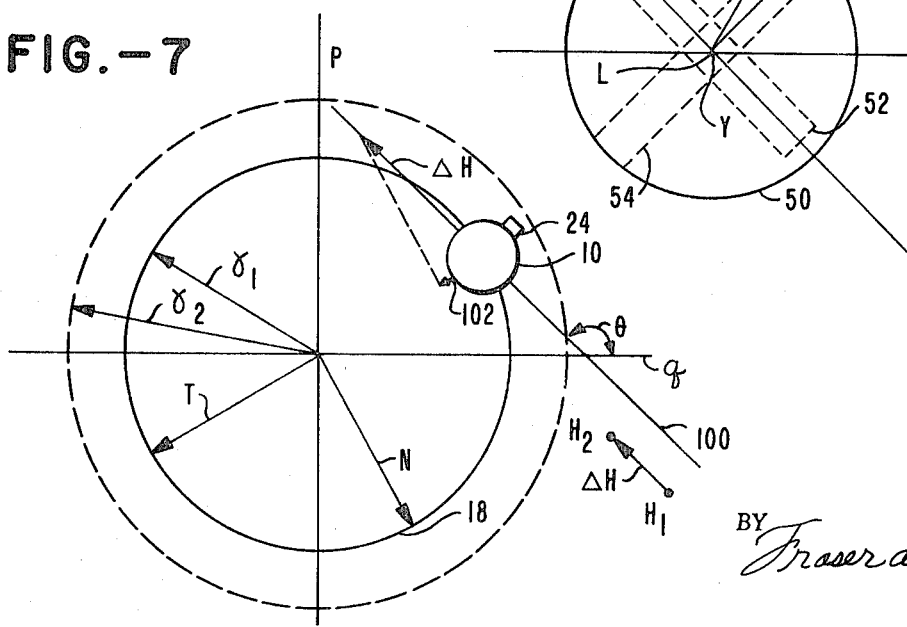
INVENTOR.
ANDRE LANZARO
BY Fraser and Bogucki
ATTORNEYS

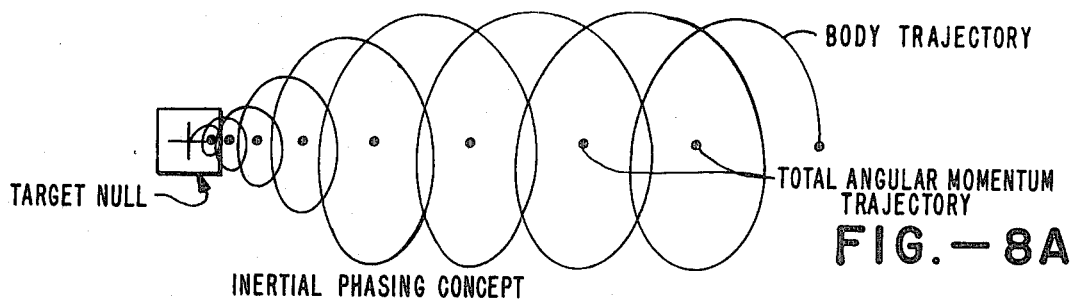
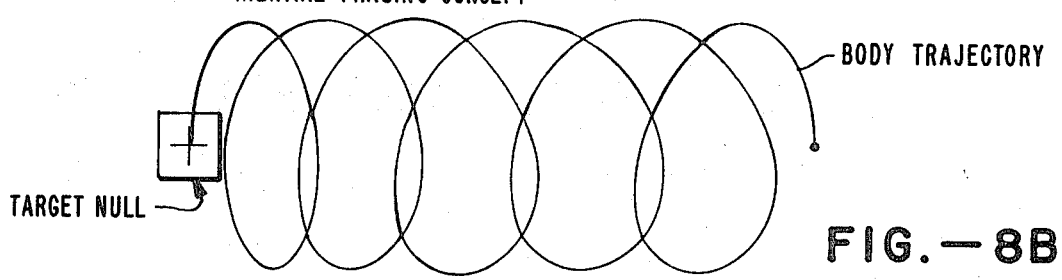
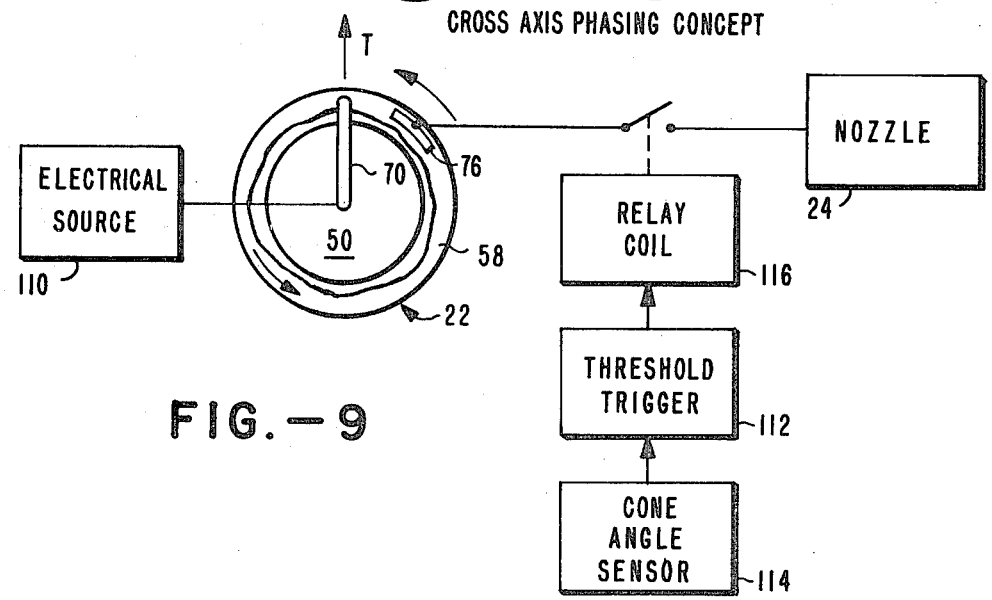
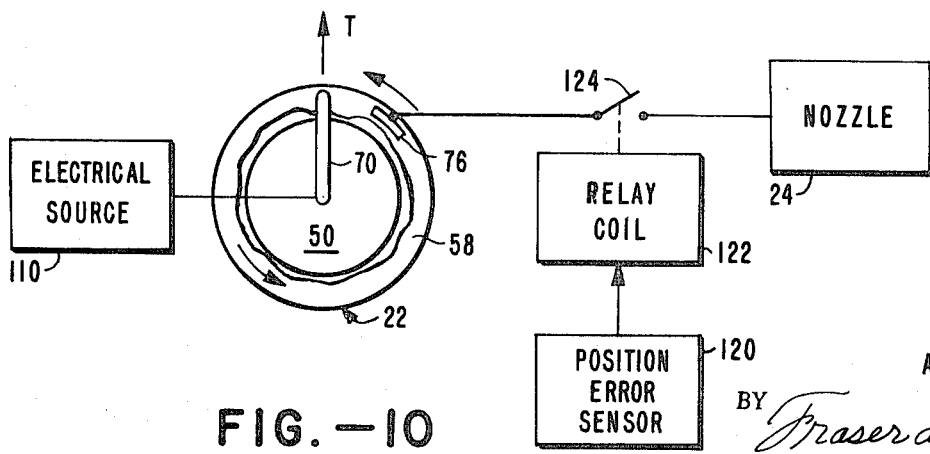
INVENTOR.
ANDRE LANZARO

CROSS-RATE AXIS SENSOR

BACKGROUND OF THE INVENTION

1. Field of the Invention

The present invention relates to space vehicle guidance control systems, and more particularly to active control systems wherein information as to the behavior of the vehicle is used to phase torques generated by a vehicle mounted thrust nozzle.

2. Description of the Prior Art

Numerous systems have been proposed for controlling the behavior of moving objects such as space vehicles. Space vehicles are capable of undergoing a variety of different motions depending upon many factors such as the trajectory of the vehicle and the physical characteristics of the vehicle. Elongated cigar-shaped vehicles typically have a spinning motion imparted to them so that they spin about their longitudinal axis. This spinning motion in combination with other factors results in the vehicle undergoing coning motion about its center of gravity. While a certain minimal amount of coning motion is tolerable, too much coning motion results in the inefficient flight of the vehicle and more particularly in the loss of substantial or even in some cases complete control of the vehicle. In order to point the vehicle in a desired direction, a process which is normally termed attitude control, it is frequently necessary to reduce the coning motion of the vehicle to a certain minimal level.

Depending upon the type of vehicle control system used, coning motion may be reduced or eliminated either before, during or after attitude correction of the vehicle. Passive-type control systems utilize a portion of the energy of the moving vehicle to control its behavior. Vehicle energy is continually used up and there is a constant danger that the vehicle will be sufficiently robbed of energy so as to impair the basic desired motions of the vehicle. For example, in a passive control system there is always the danger that vehicle spin will deteriorate sufficiently to render the vehicle uncontrollable as more and more vehicle energy is used up to reduce coning.

Active-type control systems control the behavior of the vehicle by generating their own energy rather than using a part of the existing energy of the vehicle. Such systems typically employ a nozzle mounted on the vehicle to generate thrust at desired times, the activation of the nozzle being phased in accordance with the instantaneous attitude of the vehicle and the instantaneous position of the vehicle within the conical orbit. One or more sensors mounted within the vehicle may be referenced to one or more external references such as the sun or a star target. Since external references provide only an indirect indication of actual vehicle behavior, most known control systems at best provide an indirect approach to control Ideally, for example, coning motion of a spinning vehicle should be controlled by referencing an active control system to the actual angular motion which the vehicle is undergoing due to the coning motion.

BRIEF SUMMARY OF THE INVENTION

In brief, the present invention provides a sensor which may be advantageously used in an active-type control system to reduce or eliminate the coning motion of a spinning vehicle either alone or in combination with attitude control of the vehicle. A coning vehicle has an angular velocity about its longitudinal axis due to spin motion and a transverse angular velocity about an axis perpendicular to the longitudinal axis due to cross spin. The instantaneous component of transverse angular velocity provides a constant indication of the axis about which the vehicle rotates as it traverses the conical orbit. The sensor continually aligns itself with the instantaneous direction of transverse angular velocity, and the generation of torques by a nozzle mounted on the vehicle may be phased in accordance with the angular position of the vehicle relative to the internally mounted sensor.

In accordance with one particular aspect of the invention, the sensor may comprise a hollow cylindrical member rotatably mounted about its axis of elongation within the spinning vehicle. A second cylindrical member or momentum wheel is rotatably mounted as a gyroscope in a single degree of freedom gimbal system within the hollow interior of the first cylindrical member with axis of rotation perpendicular to and intersecting the axis of elongation of the first cylindrical member, and is rotatively driven by appropriate means to obtain a high angular momentum to act as a gyroscope element in a balanced single degree of freedom gimbal system. The second cylindrical member or momentum wheel continually aligns its axis of rotation with the direction of the cross-rate axis or instantaneous direction of angular velocity of the vehicle due to coning motion. Alignment of the momentum wheel rotates the first cylindrical member in a manner independent of the position or rate of movement of the vehicle about its spin orbit.

In accordance with a further aspect of the invention the angular position of the first cylindrical member of the sensor relative to the vehicle is utilized to generate torques only when the vehicle assumes a position or positions within its spin orbit whereby the generation of torques will tend to reduce or eliminate coning motion. A wiper arm is mounted on the first cylindrical member and is adapted to make contact with a commutator segment fixedly mounted within the vehicle at those relative angular positions which will result in the reduction of coning if the nozzle is energized. A slip ring assembly mounted between the vehicle and the first cylindrical member completes an electrical circuit to the wiper arm, and contact of the commutator segment by the wiper arm results in the energization of a vehicle mounted nozzle to generate torque.

In accordance with further aspects of the invention, the sensor may be used either alone in conjunction with a thrusting means to correct the coning motion of a vehicle or in combination with a separate sensor and control system to correct for both attitude error and coning motion. The complete elimination of coning motion is virtually impossible, and further attempts to reduce coning motion once a minimum cone size has been reached often result in such motion being increased rather than decreased. Accordingly, the sensor of the present invention may be used in combination with a threshold detector which stops control of the vehicle by the sensor whenever the coning amplitude has been reduced to a predetermined minimal size. Alternatively, the sensor of the present invention may be serially coupled with another sensor system to control both coning and attitude, the cross-rate axis sensor of the invention providing for the generation of thrusts when they will reduce the coning motion and the other sensor overriding the control exercised by the cross-rate axis sensor so as to permit energization of the nozzle only when thrusts will reduce the attitude error of the vehicle.

BRIEF DESCRIPTION OF THE DRAWING

The novel features of this invention, as well as the invention itself, both as to its organization and method of operation, may best be understood when considered in the light of the following description, when taken in connection with the accompanying drawings, in which:

FIG. 1 is a diagrammatic illustration demonstrating the characteristic motions of a spinning space vehicle;

FIG. 2 is a diagrammatic illustration of the various components of angular velocity and momentum resulting from the characteristic motions of FIG. 1;

FIG. 3 is a perspective, partly broken away view of a preferred form of cross-rate axis sensor in accordance with the invention;

FIG. 4 is a section view of the sensor of FIG. 3 taken along the line 4—4;

FIG. 5 is a diagrammatic representation of a portion of the sensor of FIG. 3 which is useful in illustrating the manner in which the sensor operates;

FIG. 6 is another diagrammatic representation of a portion of the sensor of FIG. 3 which is useful in illustrating the manner in which the sensor operates;

FIG. 7 is another diagrammatic representation showing the effect of a thrust produced by the system of the invention on mean attitude and coning angle of the vehicle;

FIG. 8A is a diagrammatic representation of vehicle trajectory under an inertial phasing concept;

FIG. 8B is a diagrammatic representation of vehicle trajectory under a cross axis phasing concept;

FIG. 9 is a simplified block diagram of one form of vehicle control system in accordance with the invention; and FIG. 10 is a simplified block diagram of another form of vehicle control system in accordance with the invention.

DESCRIPTION OF THE PREFERRED EMBODIMENTS

FIG. 1 illustrates the characteristic motions undergone by an elongated cigar-shaped space vehicle 10. The vehicle 10 undergoes spinning motion in a direction shown by the curved arrow 12 about its longitudinal axis 14. The vehicle 10 also undergoes the characteristic wobbling or coning motion commonly called nutation about its center of gravity 16 with the longitudinal axis 14 defining a coning orbit 18. The longitudinal axis 14 of the vehicle 10 moves about the conical orbit 18 in a direction shown by the curved arrow 20. A cross axis rate sensor 22 in accordance with the invention is mounted at any convenient position within the vehicle 10 so that its longitudinal axis either coincides with or is parallel to the longitudinal axis 14 of the vehicle, the former case being illustrated in FIG. 1 and hereafter for convenience of illustration. The sensor 22 may be used alone or in combination with one or more other sensors (not shown) to control the energization of a nozzle 24 mounted on the vehicle. The mean attitude of the vehicle 10 is represented by the central axis 26 of the conical orbit 18 since the vehicle revolves about the orbit in the direction shown by the arrow 20. The attitude of the vehicle 10 is in error to the extent that the axis 26 deviates from the desired vehicle heading.

The characteristic motions of the vehicle 10 may be represented in terms of their components of angular velocity and momentum as illustrated in FIG. 2. The spinning motion of the vehicle 10 about its longitudinal axis 14 may be represented in terms of a body cone 30 which rolls about the outer surface of a space cone 31 as the vehicle undergoes coning motion. The vehicle 10 has a total angular velocity vector 32 which always coincides with the line of contact of the body and space cones 30 and 31. The angular velocity vector 32 may be resolved into a longitudinal component vector 34 along the vehicle longitudinal axis 14 due to spin rate, and a transverse component vector 36 due to the coning motion of the vehicle. The component vector 36 which is conveniently termed the cross-rate vector (or transverse component of angular velocity) is perpendicular to the vector 34 and always points in a direction toward the central axis 37 of the space cone 31. The axis of the vector 36 is accordingly termed the cross-rate axis, and it is this axis which the sensor of the present invention continuously follows. The cross-rate vector 36 revolves about the central axis 37 and its magnitude is dependent on the movement of the body cone 30 about the space cone 31. The total angular momentum of the vehicle 10 which is a vector 40 lying along the space cone central axis 37 is comprised of a component vector 42 due to the spinning motion of the vehicle and a component vector 44 due to the coning motion of the vehicle.

The details of the cross-rate axis sensor 22 may be understood with reference to FIGS. 3 and 4. The sensor 22 comprises a first cylindrical member 50 having a hollow interior within which is rotatably mounted a second cylindrical member 52. The second cylindrical member 52 is hereinafter referred to as the momentum wheel 52 because of its gyroscope function within the sensor 22, and the first cylindrical member 50 is conveniently termed the cylinder 50 for purposes of subsequent discussion. The momentum wheel 52 comprises a relatively heavy casing of generally cylindrical configuration fixedly mounted on the outer periphery of the rotor of an electric drive motor 53 (shown in dotted outline in FIG. 4), the stator of which is fixedly mounted on a shaft 54. The longitudinal spin axis 55 of the momentum wheel 52 coincides with the central axis of the shaft 54 and is perpendicular to and intersects the longitudinal axis 56 of the cylinder 50. The stator of the drive motor 53 is positioned along the length of the shaft 54 to maintain the momentum wheel 52 approximately equidistant from opposite portions of the cylindrical inner wall 57 of the cylinder 50 to which the opposite ends of the shaft 54 are fixedly mounted so that the longitudinal mounting axis 56 of the cylinder 50 intersects it center of mass to provide a balanced single degree of freedom gimbal system. The momentum wheel 52 is rotatively driven by the drive motor 53 to obtain a relatively high angular momentum. The motor 53 is only one example of the manner in which the momentum wheel 52 may be rotatively driven, and other appropriate gyro drive means such as a pneumatic arrangement may be employed if desired.

The cylinder 50 is rotatably mounted about its longitudinal axis 56 by a housing 58 which comprises inner and outer hollow cylindrical portions 60 and 62 respectively. The cylinder 50 is rotatably mounted to the inner wall of the inner cylindrical portion 60 by separate bearing arrangements 64 and 66. The sensor housing 58 is fixedly mounted within the vehicle 10 so that the longitudinal axis 56 of the cylinder 50 coincides with the longitudinal axis 14 of the vehicle.

It will be shown from the discussion to follow that the spin axis 55 of the momentum wheel 52 always points in the same direction as the cross-rate vector 36, and it is for this reason that the sensor 22 is termed a cross-rate axis sensor. The momentum wheel 52 and cylinder 50 move independently of the housing 58 and vehicle 10 to follow the cross-rate vector 36 as the vehicle moves about the coning orbit 18, and the spinning motion of the vehicle 10 provides rotation of the housing 58 and its inner cylindrical portion 60 relative to the cylinder 50.

As the vehicle 10 spins about its longitudinal axis 14, the nozzle 24 moves about the longitudinal axis 14 at the spin rate. Since thrusts of the nozzle 24 at different angular positions of the vehicle 10 about its spin orbit will affect the conical orbit 18 differently, it is highly desirable that any nozzle thrust and the resulting torques on the vehicle produced thereby be phased so as to reduce coning motion. The cylinder 50 and momentum wheel 52 provide a continuous coning reference, and the angular position of the housing 58 and associated vehicle 10 relative to the cylinder 50 is used to provide a continuous indication of the orientation of the nozzle 24 relative to the coning orbit 18. A predetermined range of angular positions of the housing 58 relative to the cylinder 50 defines a region wherein thrusts from the nozzle 24 will reduce coning. At all other angular positions, nozzle thrusts will either increase coning or have no effect on it.

A wiper arm 70 is fixedly attached to the cylinder 50 by means of a rod 72 extending from the arm 70 through an aperture 74 in the end of the housing inner cylindrical portion 60 to the cylinder 50. The wiper arm 70 moves with the cylinder 50 and wheel 52, and provides a coning orbit reference. A commutator segment 76 is mounted on the outside surface of the housing inner cylindrical portion 60 adjacent the wiper arm 70, and extends a fixed distance in the circumferential direction about the longitudinal axes 14 and 56. Contact of the wiper arm 70 with the commutator segment 76 defines those angular positions of the cylinder 50 relative to the housing 58 at which nozzle thrust will reduce the size of the coning orbit 18. A slip ring assembly 78 has inner and outer portions mounted on the cylinder 50 and the housing 58 respectively and provides an electrical circuit path to the wiper arm 70, the connections therebetween having been omitted from FIGS. 3 and 4 for the sake of clarity. The slip ring assembly 78 also provides a circuit path to the electric drive motor 53. By serially coupling the wiper arm 70 and segment 76 in a circuit to energize the nozzle 24, thrusts are produced only during selected angular positions of the cylinder 50 relative to the housing 58, and the resulting torques on the vehicle 10 are phased so as to reduce coning. The space between the inner and outer cylindrical portions 60 and 62 of the housing 58 may be used to house associated electronics so that the sensor 22 may be used as a single complete unit. A plug 80 which is mounted in one end wall of the housing 58 may be used to provide electrical coupling of the sensor 22 to circuits within the vehicle.

An understanding of the reasons for the behavior of the sensor 22 may be had with reference to FIGS. 5 and 6. For purposes of discussion, the longitudinal or spin axes of the cylinder 50 and the momentum wheel 52 may be designated Y and Z respectively, the X-axis which completes the coordinate system being perpendicular to and intersecting both axes Y and Z. The total torque $T_C$ on the cylinder 50 from the vehicle 10 body and the momentum wheel 52 may be represented by the expression $\vec{T_C} = \vec{T_W} + \vec{T_B}$ where $\vec{T_W}$ represents the reaction torque of the momentum wheel and $\vec{T_B}$ represents the torque exerted on the cylinder by the vehicle body. A vectorial differential equation may then be written as follows:

$$\left(\frac{d}{dt}\vec{H_C} + \vec{\Omega} \times \vec{H_C}\right) = -\left(\frac{d}{dt}\vec{H_W} + \vec{\Omega} \times \vec{H_W}\right) + \begin{pmatrix} Tx \\ 0 \\ Tz \end{pmatrix} \quad (1)$$

where $\vec{H_C}$ is the angular momentum of the cylinder 50, $\vec{\Omega}$ is the angular velocity of the cylinder, $\vec{H_W}$ is the angular momentum of the momentum wheel, $T_X$ is the component of the body torque $\vec{T_B}$ about the X-axis, and $T_Z$ is the component of the body torque $\vec{T_B}$ about the Z-axis. Scalar evaluation of equation 1 provides the basic differential equations of motion which assume the form:

$$(A+A')\dot{W_1} + (C-B)W_2 W_3 + W_2 H - A' W_2 W_3 = Tx \quad (2)$$
$$(B+A')\dot{W_2} + (A-C)W_3 W_1 + A' W_1 W_3 - W_1 H = 0 \quad (3)$$
$$C\dot{W_3} + (B-A)W_1 W_2 = Tz \quad (4)$$

where $A$, $B$, and $C$ are the moments of inertia of the cylinder 50 about the X-, Y-, and Z-axes respectively, $A'$ is the moment of inertia of the momentum wheel 52 about the X-axis, $W_1$, $W_2$, and $W_3$ are the components of the angular velocity of the cylinder with respect to the X-, Y-, and Z-axes respectively, and $H$ is the Z-axis component of the wheel 52 momentum.

FIG. 6 is an end view of the arrangement of FIG. 5 as such arrangement appears along the Y-axis, a horizontal reference line R being illustrated as passing through the intersection of the X-, Y-, and Z-axes. The cross-rate vector 36 is assumed to deviate from the Z-axis and reference line R by the angles $\beta$ and $\alpha_c$ respectively, the angle between Z and R being designated $\alpha_w$. $\omega_c$ represents the magnitude of cross-rate about the cross-rate axis 36. If the angle $\beta$ is assumed to be small such that $\sin \beta = \beta$, then a linear differential equation may be written as follows:

$$\ddot{\beta} + \omega_c p \beta = \ddot{\alpha}_c \quad (5)$$

where $p=(H/B_T)$ and $B_T = B+A'$. Equation 5 has a time dependent parameter $\omega_c$.

If the space vehicle 10 is assumed to undergo free coning motion about a cone angle which is relatively small (on the order of 20° or less) and the magnitude of cross-rate is substantially constant, then the following equation may be written:

$$\ddot{\beta} + \omega^2 \beta = 0 \quad (6)$$

where $\omega^2 = \gamma P_p$, $\gamma$ is the cone angle, and $P$ is the coning frequency. Equation 6 is that of a spring in undamped oscillation about zero at frequency $\sqrt{\gamma P_p}$. The spin axis of the momentum wheel 52 thus follows the cross-rate axis 36 and oscillates about zero misalignment ($\beta=0$). The amplitude of oscillation is determined by initial conditions and may be expressed by the equation:

$$\beta = \beta_o/\omega \sin \omega \tau \quad (7)$$

If some damping is present or introduced, the oscillations are damped out and a steady state is reached where $\beta=0$, $\dot{\alpha}_w = \dot{\alpha}_c$ and $\alpha_w = \alpha_c$.

The above discussion indicates that, under free coming conditions, the sensor tracks the cross-rate axis without hangoff (deviation of the momentum wheel 52 axis from the cross-rate axis 36), although some damping is required if greater stability is to be realized. The oscillation frequency $\omega$ is dependent on the coning frequency, and the angle of cone or the transverse rate. If the cross-rate axis 36 is accelerating or decelerating relative to the reference line R during initial conditions, a constant hangoff is provided, and, if at a later time such acceleration or deceleration disappears, the sensor continues to oscillate about null tracking. When either the cross-rate magnitude $\omega_c$ or the cone angle $\gamma$ becomes zero, the sensor loses reference. This is one of the reasons for the termination of nozzle control by the sensor when the cone angle reaches a predetermined minimum size as mentioned above and as discussed in detail below. If the oscillation frequency $\omega$ of the sensor about the cross-rate axis 36 is less than the coning frequency, then the sensor becomes unstable.

If the cross-rate axis 36 is undergoing acceleration or deceleration, a position hangoff of the sensor relative to the cross-rate axis results and the following equation may be written:

$$\ddot{\beta} + \omega^2 \beta = \ddot{\alpha}_p \quad (8)$$

Solving equation 8 provides the equation:

$$\beta = (\ddot{\alpha}_o/\omega^2)(1 - \cos \omega \tau) \quad (9)$$

The average hangoff error $\beta_e$ may then be represented by the expression: $\beta_e = (\ddot{\alpha}_o/\omega^2)$. (10)

The X-, Y-, Z-coordinate system as shown in FIGS. 5 and 6 provides a convenient reference in discussing the characteristic behavior of the sensor 22 in a spinning space vehicle undergoing coning motion. For purposes of discussing the behavior of the space vehicle 10 under the influence of the nozzle 24, as controlled by the sensor 22, the same coordinate system may be used. However, for the sake of convenience, the various axes are more readily referred to in terms of sensor behavior relative to an inertial coordinate system $p,q$, in which event the Y-axis which is the longitudinal axis of the sensor 22 and its cylinder 50 may be termed L, the Z-axis which is the spin axis of the momentum wheel 52 and is transverse to the longitudinal axis L may be termed T, and the X-axis which is always normal to the spin axis of the momentum wheel 52 may be termed N.

Referring to FIG. 7, the behavior of the space vehicle 10 is illustrated with reference to inertial coordinates $p,q$. The origin of the $p,q$ coordinate system represents the desired attitude or heading of the vehicle 10 and also serves as the center of the conical orbit 18. Since the momentum wheel 52 spin axis continuously follows the cross-rate axis with little or no hangoff under the above-stated conditions, the T- and N-axes are depicted in FIG. 7 as rotating about the conical orbit 18 as the vehicle 10 moves about such orbit. The initial conical orbit, before any torque is generated by the nozzle 24, is represented by the solid line circle 18 which has a cone angle of $\gamma_1$. As mentioned in connection with the discussion of FIG. 2, the total angular momentum vector 40 of the vehicle, which may be represented by H, always lies along the central axis of the cone. The vector H, however, may be separated from the conical orbit so as to be considered separately. For this reason, the origin of the $p,q$ inertial coordinate system, which lies along the central axis of the conical orbit 18, represents the desired mean attitude of the vehicle 10 and the movement of the angular momentum vector H toward or away from the origin may be represented by various points lying within the $p,q$ plane.

As shown in FIG. 7, the space vehicle 10 is initially assumed to have a total angular momentum vector $H_1$ before any thrusts are generated by the nozzle 24 under the control of the sensor 22. It will therefore be understood that there are two major considerations involved in changing the attitude, or pointing, of a spinning body or space vehicle. The first consideration is that of the total angular momentum vector H. H is the average or mean attitude of the vehicle, and, as shown in FIG. 7, it is desired to bring H to the origin of the $p,q$ coordinate system representing the desired heading or pointing. The second consideration is that of the coning amplitude or angle $\gamma$, which angle must be brought to zero or near zero for attitude stabilization about a total angular momentum vector representing the new pointing of the vehicle. Thus, as shown in FIG. 7, it is desired to reduce $\gamma$ to zero or near zero.

Each thrust generated by the vehicle mounted nozzle 24 results in a corresponding torque along a torque axis 100, which axis remains in a fixed orientation relative to the nozzle 24 and rotates with the vehicle 10 as it spins. If it is assumed that the nozzle 24 can only expend thrust for a fixed finite duration, thereby producing torques for a fixed duration, the time integration of the torque is found to be a vector quantity called torque-impulse which may be represented by a change in the total vehicle angular momentum H or a $\Delta H$ vector. For every torque fired for a fixed time duration, a $\Delta H$ vector representing the vectorial change in angular momentum due to the torque can be associated with the torque-time event. If it is assumed that the nozzle 24 generates infinite torque for an infinitesimal time interval, then the net time integral results in a vector $\Delta H$ being generated along the torque axis 100 of the vehicle 10. If a finite torque is generated for a finite period of time, then the net $\Delta H$ vector will not be exactly parallel to the torque axis 100, due to the vehicle body integration of the rotating torque vector. If the angle between the vehicle torque axis 100 and the $q$ axis of the inertial coordinate system is designated $\theta$, then torque may be expressed by the following equation:

$$\overline{\Delta H} = (\Delta H \cos \theta, \Delta H \sin \theta) \quad (11)$$

The cone angle $\gamma_2$ and total angular momentum vector $H_2$ which will result from a torque vector $\Delta H$ may then be expressed by the equations:

$$\gamma_2 = \gamma_1 + (\Delta H/PI_T) \cos (\theta - \alpha) \quad (12)$$
$$\overline{H_2} = \overline{H_1} + (\Delta H \cos \theta, \Delta H \sin \theta) \quad (13)$$

where $P$ is the coning frequency of the vehicle, $I_T$ is the transverse moment of inertia of the vehicle, and $\alpha$ is the angle between the $q$ axis and the momentum wheel 50 spin axis or transverse axis T.

It is thus possible to keep track of the state of the vehicle 10 after each torque impulse. As shown in FIG. 7, a nozzle 24 produced thrust provides a torque vector $\Delta H$ parallel to the vehicle torque axis 100. With the torque axis 100 located as shown during the producing of such thrust, the vector $\Delta H$ is added to the initial angular momentum vector $H_1$ to provide a new vector $H_2$. In terms of the vehicle coning orbit, the torque vector $\Delta H$ may also be represented as extending from the spin axis of the vehicle 10 along the torque axis 100 as shown. From equation 12 it will be seen that the coning amplitude $\gamma$ is affected by the component of $\Delta H$ along the T-axis, components in the +T direction increasing $\gamma$ and components in the −T direction decreasing $\gamma$. In the example of FIG. 7, the torque vector $\Delta H$ has a component vector 102 along the T-axis, the vector 102 increasing the cone angle to a new and larger angle $\gamma_2$, since the vector 102 extends in the +T direction.

The example of FIG. 7 illustrates the close relationship between the angle $\gamma$ and total angular momentum vector $H$, and the problems involved in both reducing cone angle and attitude error by single impulses from the vehicle mounted nozzle 24. Thus, the torque vector $\Delta H$, as shown in FIG. 7, reduces the vehicle attitude error by bringing $H$ closer to the origin of the $p,q$ coordinates, but at the same time increases vehicle coning from $\gamma_1$ to $\gamma_2$. Different approaches for reducing coning and attitude error are thus possible. One approach is to generate torques parallel with the $p$ axis moving $H$ to the origin or 0 by steps of $\gamma H$. In such an approach, the coning amplitude $\gamma$ alternately grows and decays depending on the algebraic addition of $\Delta H$ components along the T-axis. When $H$ reaches null (the origin of the $p,q$ coordinate system), a residual coning motion ordinarily exists, requiring that such motion be reduced to a minimal level or eliminated. An alternative approach is to generate torques $\Delta H$ along the negative T-axis which has the effect of reducing the coning motion or cone angle $\gamma$ to 0. In this situation, the total angular momentum vector $H$ may be moved toward and away from null so as to reside at some point off null when the coning motion has been eliminated. Rate feedback may be employed to limit the allowable cross-rate while bringing $H$ to null. Such a technique is effective, but requires a great deal of nozzle fuel.

It has been found that highly effective and efficient attitude control is provided by phasing torques with respect to the cross-rate axes T and N rather than with the error axes $p$ and $q$ of the inertial coordinate system. FIG. 8 illustrates the differences in attitude control concepts, FIG. 8A illustrating the inertial phasing concept and FIG. 8B illustrating the more desirable cross axis phasing concept. The cross axis phasing concept or method in accordance with the invention controls the vehicle body, while the inertial method controls essentially the total angular momentum vector $H$. In the inertial phasing concept of FIG 8A wherein rate feedback is employed, $H$ is initially moved toward null without attempting to reduce the coning motion. When $H$ resides within a certain proximity of null, however, the coning amplitude is systematically reduced until it is substantially eliminated as $H$ reaches null. Since it is virtually impossible to completely eliminate all coning motion when the attitude error has been reduced substantially to zero, vehicle control systems are typically referenced to a null dead space region which may be defined as a cone having an angle of a few degrees or less and a central axis substantially coincident with the desired direction of vehicle attitude. Different control systems attempt to reach null dead space by different techniques and using different methods. In the inertial phasing concept of FIG. 8A, for example, the system attempts to bring the total angular momentum vector $H$ within null dead space. The cross axis phasing concept of FIG. 8B, however, attempts to bring the vehicle itself, rather than $H$, into null dead space.

The above discussion in connection with FIGS. 5–8 involves total vehicle control considerations, including those as to attitude correction and those as to deconing or denutation. The sensor 22 in accordance with the present invention, however, may be advantageously used by itself to effect vehicle deconing independent of attitude correction. Such a system is substantially insensitive to variations in vehicle attitude, and attempts only to substantially reduce the coning motion of the vehicle. To accomplish this, the nozzle 24 is phased such that it produces torque substantially only in the direction of the the −T-axis. Since the vehicle 10 spins about its longitudinal axis 14 relative to the T-axis, the T-axis moving with the coning motion of the vehicle and being substantially independent of vehicle spin, the single commutator segment 76 illustrated in FIGS. 3 and 4 is located on the inner cylindrical portion 60 of the sensor housing 58, such that an electrical circuit is completed between an electrical source 110 and the nozzle 24 only during those portions of the spin orbit of the vehicle at which torques along the −T-axis will be provided. With the wiper arm 70 held in a substantially fixed position relative to the T-axis, the sensor housing 58 and the fixed commutator segment 76 rotate at the spin rate of the vehicle to fire the nozzle 24 once each revolution, as shown in FIG. 9. Since a minimum cone angle may be reached, beyond which further attempts to reduce the cone size may result in increased coning motion, a threshold trigger 112 responds to a cone angle sensor 114 to deenergize a relay coil 116, breaking the electrical circuit to the nozzle 24 when a predetermined minimum cone angle is achieved. The relay coil 116 remains energized to complete the circuit to the nozzle only so long as the cone is greater than the predetermined minimal size.

As previously mentioned, the arrangement of FIG. 9 operates independently of vehicle attitude and fires thrusts to reduce vehicle coning motion regardless of their effect on attitude error. In order to reduce both coning motion and attitude error to their practical minimum limits, it is necessary to control the operation of an arrangement such as that of FIG. 9 in accordance with attitude error, such an arrangement being shown in FIG. 10. A position error sensor 120, which may be referenced to an internal reference system such as an inertial one or an external reference system such as a stellar body or the sun, energizes a relay coil 122 to complete an electrical circuit to the nozzle 24 only when a nozzle produced thrust will reduce the vehicle means attitude error. The result is that those electrical signals from the sensor 22, which would reduce coning motion but which would increase attitude error, are blocked by the open contact 124 of the relay 122 so as not to energize the nozzle 24. The relay 122 and position error sensor 120 in effect act as a second gate in series between the first gate provided by the sensor 22 and the nozzle 24, the wiper 70 and segment 76 making contact when a nozzle thrust will reduce the cone amplitude, and the relay contact 124 closing when the thrust will move the vehicle body axis toward the target.

The cross axis rate sensor 22 of the invention can be employed in an arrangement similar to that of FIG. 10 to provide an effective method of pitchover, if desired. With the wiper arm 70 aligned relative to the N-axis instead of the T-axis, the components of $\Delta H$ provided by the resulting thrusts of the nozzle 24 will have zero value along the T-axis and coning amplitude will not be affected. The total angular momentum vector $H$ is thus positioned to any desired attitude in space. The position error sensor 120 and relay coil 122 again serve as a second gate to select out of the allowable instances for control thrusts those instances where the vehicle will move in the direction of the prescribed target.

Cross-rate axis sensors in accordance with the invention can be used in combination with various types of control system apparatus to provide various desired control techniques. By combining pitchover and decone systems, such as for a control system similar to that described in applicant's copending U.S. Pat. application, Ser. No. 662,130, filed Aug. 21, 1967, entitled "Space Vehicle Attitude Control" a simplified solar pointing system can be had. For example, a single solar sensor having two segmented apertures separated by 90° can be used. One segment is used for deconing, in accordance with the method already described, the other segment being used to provide a second gate for the deconing system in accordance with desired pitchover control. In a further arrangement, the pitch and yaw of a spinning vehicle may be controlled by using the cross-rate axis sensor of the invention in combination with an inertial platform reference, such as that referred to as a MARS ACS sensor. Two commutator segments are symmetrically mounted about the T-axis, and a double wiper configuration having two wipers spaced 90° apart is mounted on the rotatable cylinder 50 of the sensor. The wiper arms separately provide pitch and yaw signals relative to the pitch and yaw axis coordinates of the vehicle established by the inertial platform or similar internal reference. The commutator arrangement of the cross-rate axis sensor act as the second gate to selectively pass the pitch and yaw signals to generate thrusts, whenever the inertial platform system senses that vehicle position error relative to the target will be reduced by nozzle firing.

Although there has been described a specific arrangement of a cross axis rate sensor and various systems for the use thereof in accordance with the invention for the purpose of illustrating the manner in which the invention may be used to advantage, it will be appreciated if the invention is not limited thereto. Accordingly, any and all modifications, variations or equivalent arrangements falling within the scope of the annexed claims should be considered to be a part of the invention.

What is claimed is:

1. A control system for tracking the radial orientation of the cross-rate axis about the longitudinal spin axis of a spinning vehicle undergoing coning motion comprising:
   a gyroscope element having its gyrospin axis normal to a longitudinal mounting axis that is parallel to said longitudinal spin axis of the vehicle;
   mounting means for rotatably journaling said gyroscope element for free balanced rotation of said gyrospin axis about said longitudinal mounting axis;
   sensing means for detecting the orientation of said gyrospin axis relative to a predetermined radial position on said vehicle to provide an output condition indicative of the orientation of said cross-rate axis relative to said predetermined radial position; and,
   means responsive to said sensing means for controlling the orientation of said vehicle.

2. The sensor system of claim 1 wherein:
   said mounting means constitutes a balanced single degree of freedom gimbal system; and,
   said sensing means includes indicator means affixed to said gimbal for rotation about said longitudinal mounting axis with said gyrospin axis, and a sensing element affixed to said vehicle for movement therewith about said longitudinal spin axis and responsive to the orientation of said indicator means at said predetermined radial position for providing said output indication.

3. The sensor system of claim 2 wherein:
   said sensing means includes a commutator segment fixedly mounted within said vehicle adjacent the longitudinal axis of said cylinder, and a wiper arm affixed for rotation with said cylinder to contact said commutator segment whenever said cylinder rotates to a predetermined angular position relative to said commutator segment; and
   electrical circuit means coupled to said commutator segment and said wiper arm to be interconnected to pass an electrical signal whenever said wiper arm contacts said commutator segment.

4. The sensor system of claim 1 wherein:
   said mounting means includes a hollow cylinder rotatably mounted with its longitudinal axis parallel to the vehicle spin axis, and said gyroscope element is mounted within said cylinder with its center of mass intersected by the longitudinal axis of said cylinder.

5. The sensor system of claim 1 wherein:
   said means for controlling the orientation of said vehicle is adapted to generate thrust to change the orientation of its spin axis and said predetermined radial position on said vehicle is determined by the radial direction of said thrust.

6. A control system for an elongated vehicle undergoing spinning about its axis of elongation and coning motion about a central axis of mean heading, comprising:
   a gyroscope means having a spin axis mounted with a single degree of freedom to provide free balanced rotational movement of said spin axis about a mounting axis parallel to the axis of elongation of said vehicle to maintain said spin axis aligned with the cross-rate axis;
   thrust means mounted on the vehicle for generating an external thrust upon energization to change the orientation of said axis of elongation;
   and sensing means including a first member mounted on the vehicle for movement about said spin axis with said thrust means, a second member mounted for rotational movement within said vehicle with the spin axis of said gyroscope means, and circuit means for energizing said thrust means whenever said first member has a predetermined angular relationship relative to said second member so that said external thrust reduces said coning motion.

7. The control system of claim 6 wherein:
   said circuit means includes gating means coupled in series between said sensing means and said thrust means for preventing the energization of said thrust means by said sensing means except when the axis of elongation of said vehicle has a predetermined angular relationship relative to a desired heading.

8. The control system of claim 7 wherein:
   said gating means includes means responsive to the amplitude of the coning motion for preventing energization of said thrust means whenever said coning motion is smaller than a predetermined amplitude.

9. The control system of claim 7 wherein:
   said gating means comprises means responsive to a predetermined angular relationship between said thrust means and said desired heading to prevent energization of said thrust means except when the external thrust generated would tend to move the axis of elongation of said vehicle toward said desired heading.

10. The control system of claim 6 wherein:
    said gyroscope element comprises a momentum wheel adapted for high-speed rotation about its spin axis, and a hollow cylindrical means for rotation about said mounting axis, said momentum wheel being centrally mounted for high-speed rotation within said hollow cylindrical mounting means with its spin axis normal to and its center of mass intersected by said mounting axis.

11. The control system of claim 10 wherein:

said sensing means comprises a first commutator switch element carried for rotation with said hollow cylindrical mounting means, and a second commutator switching element fixedly mounted within said vehicle relative to said thrust means in a preselected radial segment about said mounting axis to be contacted by said first commutator contact member, and electrically energizing means coupled to said first and second commutator contact members to energize said thrust means whenever said first commutator contact member contacts said second commutator contact member.

* * * * *